United States Patent
Gray et al.

(10) Patent No.: US 6,693,740 B2
(45) Date of Patent: Feb. 17, 2004

(54) DISPERSION MANAGED DISCRETE RAMAN AMPLIFIERS

(75) Inventors: Stuart Gray, Corning, NY (US); George F Wildeman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/214,212

(22) Filed: Aug. 7, 2002

(65) Prior Publication Data

US 2003/0035207 A1 Feb. 20, 2003

Related U.S. Application Data

(60) Provisional application No. 60/310,477, filed on Aug. 7, 2001.

(51) Int. Cl.[7] .......................... H04B 10/18; G02B 6/02; H01S 3/00
(52) U.S. Cl. ................. 359/337.4; 359/334; 359/337.5; 372/3; 372/6
(58) Field of Search ................................. 359/134, 160, 359/334, 337, 337.4, 337.5; 372/3, 6

(56) References Cited

U.S. PATENT DOCUMENTS

| | | | |
|---|---|---|---|
| 5,887,093 A | * | 3/1999 | Hansen et al. ................. 385/27 |
| 6,097,870 A | * | 8/2000 | Ranka et al. ................ 385/127 |
| 6,141,090 A | * | 10/2000 | Mamyshev et al. ......... 356/73.1 |
| 6,445,862 B1 | * | 9/2002 | Fajardo et al. .............. 385/125 |
| 6,490,398 B2 | * | 12/2002 | Gruner-Nielsen et al. .. 385/123 |
| 6,496,631 B2 | * | 12/2002 | Tsukitani et al. ........... 385/123 |
| 6,526,209 B1 | * | 2/2003 | Hasegawa et al. .......... 385/127 |
| 6,571,045 B2 | * | 5/2003 | Hasegawa et al. .......... 385/125 |
| 2002/0131160 A1 | * | 9/2002 | McNieal ..................... 359/337 |
| 2002/0159731 A1 | * | 10/2002 | Gruner-Nielsen et al. . 385/123 |

FOREIGN PATENT DOCUMENTS

| EP | 0554714 | * | 8/1993 |
|---|---|---|---|
| EP | 590633 | * | 4/1994 |

OTHER PUBLICATIONS

"Toward practical holey fiber technology: fabrication, splicing, modeling, and characterization" P.J. Bennett et al., Sep. 1, 1999, vol. 24, No. 17, Optics Letters, p. 1203–1205.

"All–silica single–mode optical fiber with photonic crystal cladding" J.C. Knight et al., Oct. 1, 1996, vol. 21, No. 19, Optics Letters, p. 1547–1549.

"A Holey Fibre Raman Amplifier and All–Optical Modulator" Lee et al ECOC2001 paper PDA 1.1.

* cited by examiner

*Primary Examiner*—Nelson Moskowitz
(74) *Attorney, Agent, or Firm*—Svetlana Z. Short

(57) ABSTRACT

An optical amplifier comprises: (i) an input port for providing optical signal to the amplifier; (ii) an output port for providing amplified optical signal out of the amplifier; (iii) at least two optical fibers, one optical fiber having positive dispersion $D_1$ of greater than 10 ps/nm/km in a 1550 nm to 1620 nm wavelength range, the other fiber having negative dispersion $D_2$ of less than −5 ps/nm/km in a 1550 nm to 1620 nm wavelength range, wherein the length of each of said optical fiber is chosen to provide the amplifier with a predetermined amount of dispersion.

20 Claims, 1 Drawing Sheet

DISPERSION MANAGED DISCRETE RAMAN AMPLIFIERS

CROSS-REFERENCE TO RELATED APPLICATIONS

This application claims the benefit of U.S. Provisional Application, Ser. No. 60/310,477, filed Aug. 7, 2001 entitled Dispersion Managed Discrete Raman Amplifiers, by Stuart Gray and George F. Wildeman.

FIELD OF THE INVENTION

This invention generally concerns Raman optical amplifiers, and is particularly directed dispersion managed discrete Raman amplifiers.

BACKGROUND

Optical amplifiers for amplifying photonic signals transmitted through optical fiber networks are well known in the art. Such amplifiers are used to extend transmission distances and to compensate for losses from various network elements. Presently, there are several known types of optical amplifiers, including erbium-doped fiber amplifiers (EDFAs), and Raman amplifiers.

EDFAs typically comprise at least one pump laser whose output is optically coupled to at least one coil of erbium-doped optical fiber. In operation, the output of the pump laser excites the atoms of the erbium-dopant within the fiber. These excited atoms release their excess energy in proportion to the strength of the incoming optical signal, which results in an amplified output. By contrast, Raman amplifiers achieve amplification without the need for erbium-doped optical fibers. Therefore, Raman amplifiers may use optical fibers without Er dopant as their gain fiber.

In one type of Raman amplifier, the output of a pair of orthogonally polarized pump-diode lasers provides backward propagating pump power in the gain fiber. Alternatively, a single pump and a de-polarizer may also be utilized to provide pump power in the gain fiber. Forward-propagating signals are amplified in the gain fiber by higher energy (shorter wavelength) pump photons scattering off the vibrational modes of the optical fiber's lattice matrix and coherently adding to the lower-energy (longer wavelength) signal photons.

Raman amplifiers may be one of two types, depending upon the type of the gain fiber used therein. Distributed Raman amplifiers advantageously use the silica based optical transmission fiber itself as the gain fiber. By contrast, discrete Raman amplifiers typically utilize their own silica based optical fiber as the gain fiber. While the dopant used in the gain fiber of a discrete Raman amplifier is typically the same as used in the optical transmission fiber (e.g., germanium), the gain fiber of the discrete Raman amplifier usually contains higher concentrations of dopant (such as germanium) than a conventional optical transmission fiber and is designed to operate with a decreased fiber effective area.

The Raman gain efficiency of an optical fiber as a Raman amplifier is characterized by a figure of merit defined as $$F = \frac{G_R}{A\alpha_p}$$

where $G_R$ is the Raman scattering coefficient of the optical fiber material at the specified pump wavelength, A is the effective area of the optical fiber and $\alpha_p$ is the attenuation of the optical fiber at the pump wavelength.

Silica based Ge-doped optical fiber manufactured for use in discrete Raman amplifiers has a small effective area A, typically about 10–20 $\mu m^2$. The addition of germanium to the silica based optical fiber increases the Raman scattering coefficient, $G_R$. Because of this, the figure of merit F of this optical fiber is typically greater than 20 for pump wavelengths in the 14xx nm band. In comparison the figure of merit for a typical optical transmission fiber is about 7 or 8.

High levels of germanium dopant and small effective areas of the fibers utilized in discrete Raman amplifiers have an undesirable side-effect in that the nonlinear refractive index $n_2/A$ of these fibers is very high compared to that of transmission fibers. The net refractive index is defined by the equation $n=n_0+n_2P/A$, where $n_0$ is the linear part of the net refractive index (which is independent of the optical power P propagating through the fiber) and $n_2/A$ is the nonlinear part (which is dependent on the optical power P propagating through the fiber). For example, $n_2/A$ in a Discrete Raman gain fiber is about $3\times10^{-9}$ $W^{-1}$, compared to about $0.3\times10^{-9}$ $W^{-1}$ in a transmission fiber, such as for example, SMF-28™ available from Corning, Inc. of Corning, N.Y. The large nonlinear refractive index can lead to unwanted nonlinear interactions such as self-phase modulation (SPM), cross-phase-modulation (XPM) and four-wave mixing (FWM). In addition, this type of highly doped and small effective area fiber typically has dispersion in the range −20 to −30 ps/nm/km. Typical optical transmission fibers have dispersion values of +5 to +19 ps/nm/km.

System penalties from FWM can be significantly reduced or eliminated by using gain fibers which have a high dispersion (greater than |20| ps/mn/km) to prevent phase-matching between different signal channels. However, the gain fiber utilized in discrete Raman amplifiers is generally several kilometers in length and using gain fibers which are highly dispersive fibers will result in the discrete Raman amplifier with a significant net negative dispersion.

A highly dispersive discrete Raman amplifier will be a disadvantage in systems employing dispersion managed cable or dispersion managed fiber where either no dispersion or only a limited amount of dispersion is required at site of the amplifier.

SUMMARY OF THE INVENTION

According to present invention an optical amplifier comprises: (i) an input port for providing optical signal to the amplifier; (ii) an output port for providing amplified optical signal out of the amplifier; (iii) at least two optical fibers, one optical fiber having positive dispersion $D_1$ of greater than 10 ps/nm/km in a 1550 nm to 1620 nm wavelength range, the other fiber having negative dispersion $D_2$ of less than −5 ps/nm/km in a 1550 nm to 1620 nm wavelength range, wherein the length of each of said optical fiber is chosen to provide the amplifier with a predetermined amount of dispersion.

According to one embodiment of the present invention a discrete Raman amplifier comprises: (i) an input port providing optical signal to said amplifier; (ii) an output port providing amplified optical signal out of the amplifier; (iii) at least two optical fibers, one optical fiber having positive dispersion $D_1$ of greater than 10 ps/nm/km in a 1550 nm to 1620 nm wavelength range, and length of 5 m to 2.5 km, the other fiber having a negative dispersion $D_2$ of less than −5 ps/nm/km in a 1550 nm to 1620 nm wavelength range and length of 5 m to 2.5 km, wherein the length of each of the two optical fibers is chosen to provide this amplifier with substantially zero dispersion over the signal range, such that the dispersion of the amplifier is less than 25 ps/nm over the signal wavelength range.

BRIEF DESCRIPTION OF THE DRAWING

The invention will be described through the embodiments and the attached drawing in which.

DETAILED DESCRIPTION OF THE PREFERRED EMBODIMENT

Figure 1:
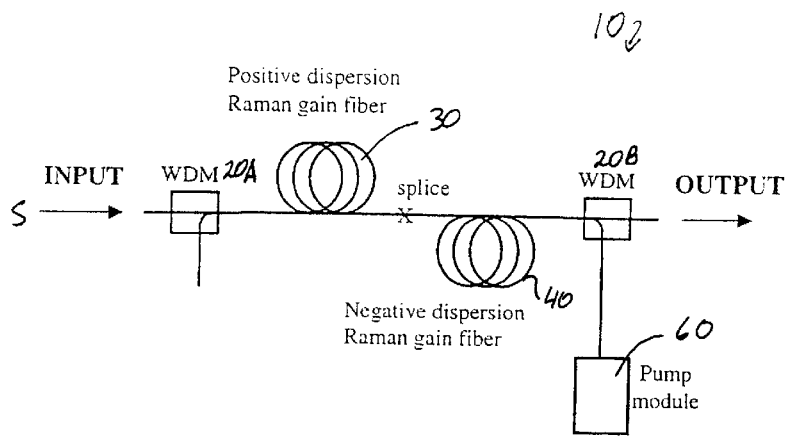
FIG. 1 is a schematic illustration of the first embodiment of a dispersion managed discrete Raman amplifier.

According to an embodiment of the present invention a discrete Raman amplifier utilizes at least two optical fibers with opposite signs of dispersion whose relative lengths are adjusted to give either a net zero dispersion, or a desired amount of dispersion. A net zero dispersion is the dispersion of less than 25 ps/nm over the signal wavelength range. Additionally, the dispersion slopes of the optical fibers could be designed to have opposite signs to achieve dispersion slope compensation. Dispersion slope is defined as the rate of change of dispersion with wavelength. Dispersion slope compensation compensates for the dispersion of an optical amplifier over a broader signal wavelength range (1550 nm<λ<1620 nm, for example) than that achieved by an amplifier that utilizes non-slope compensating fiber.

A discrete Raman amplifier may utilize at least two sections of optical fiber (one with positive dispersion and one with negative dispersion) in a single stage, where these fiber sections are spliced together. Such an amplifier may be either a single amplification stage or a multi amplification stage device. Alternatively, in a multi stage amplifier a different fiber may be used in each amplification stage. For example, the first amplification stage may have gain fiber with positive dispersion, while another stage may have gain fiber with negative dispersion. Alternatively, the first amplification stage may have gain fiber with negative dispersion, while another stage may have gain fiber with positive dispersion. Two embodiments of the dispersion compensated discrete Raman amplifiers are shown schematically in FIGS. 1 and 2 and are described in detail later in the specification. Three or more fibers with different dispersion slopes may be needed to achieve the desired dispersion slope compensation.

As mentioned above, the typical gain fiber utilized in discrete Raman amplifiers has a large negative dispersion. In order to achieve a net dispersion of zero in the discrete Raman amplifier it is desirable that this amplifier include optical fiber with large negative dispersion (D<−5 ps/nm/km, and preferably D<−10 ps/nm/km) and optical fiber wit large positive dispersion. However, optical transmission fibers with a large (>20 ps/nm/km) positive dispersion D have a very large effective area. Because the effective area of the optical fiber is inversely proportional to figure of merit F, optical fibers with large effective areas have low figures of merit, and therefore, low Raman gain efficiency. Examples of such fibers are optical transmission fibers SMF-28™ fiber (D=+17 ps/nm/km and A=80 $\mu m^2$) and Vascade™ (D=+19 ps/nm/km and A=100 $\mu m^2$), both available from Corning, Incorporated, of Corning, N.Y. In order to overcome the problem of the low Raman gain efficiency it is preferable that the positive dispersion fiber be an optical photonic crystal fiber (PCF), or another positive dispersion fiber with small effective area (A<40 $\mu m^2$). Photonic crystal fiber is disclosed, for example, in the article entitled, "All-silica single-mode optical fiber with photonic crystal cladding", by J. C. Knight et al., published in Optics Letters, vol. 21 pp 1547–1549 (1996) and is available, for example, from Crystal Fibre of Denmark. Photonic crystal fibers are manufactured with air holes in the fiber cladding and typically have very small effective areas (<15 $\mu m^2$). By adjusting the size and spacing of the air holes it is possible to make a PCF with a large positive dispersion at 1550 nm. For example, PCFs may have dispersion values as high as +50 ps/nm/km. These PCF fibers are described, for example, in the article entitled "Toward practical holey fiber technology: fabrication, splicing, modeling and characterization", by Bennet et al, published in Optics Letters vol. 24 pp 1203–1205 (1999). The small effective area of these PCFs will also increase their Raman gain efficiency compared to large effective area fibers.

Thus, according to one aspect of the present invention a discrete Raman amplifier utilizes at least two fibers with opposite signs of dispersion, where in the length of each fiber is chosen to provide a predetermined amount of dispersion (such as zero, for example). It is preferable that these fibers have opposite signs of dispersion slope to achieve the desired dispersion slope compensation. For example, two fibers having opposite signs of dispersion and opposite signs of dispersion slope can achieve a net zero dispersion over a broad wavelength rage (1550<λ<1620, for example). Two fibers having opposite signs of dispersion but the same sign of dispersion slope can only achieve a net zero dispersion at one wavelength.

For example, fibers of positive and negative dispersion may be located in the same amplifier stage. Alternatively, fibers with positive and negative dispersion may be located in different amplifier stages. As stated above, the positive dispersion fiber may be a photonic crystal fiber. More specifically, FIG. 1 illustrates a discrete Raman amplifier 10 that includes a length of positive dispersion, positive slope fiber 30 coupled to a length of negative dispersion, negative slope fiber 40. Fibers 30 and 40 are located in the same stage (the only stage) of this amplifier. An optical pump 60 is coupled to the fiber 40 via wavelength division multiplexer (WDM) 20B. The pump light from the pump 60 propagates through fiber 40 and then through the fiber 30, generating gain in counter propagating signal S. An optional second WDM 20A located upstream of fiber 30 diverts unabsorbed pump light out of the Raman amplifier and prevents it from propagating through the rest of the transmission system. It is contemplated that the length for the fibers 30 and 40 would be between 50 meters to 5 kilometers. A typical length for each of these fibers would be 500 meters to 2 kilometers. The positive dispersion fiber 30 would preferably have a dispersion value D of over +10 ps/nm/km and most preferably more than +20 ps/nm/km. The negative dispersion fiber 40 would have a dispersion value D of less than −5 ps/nm/km, preferably less than −10 ps/nm/km and most preferably less than −20 ps/nm/km. In this embodiment the length of optical fibers 30 and 40 is 2 km. The dispersion of optical fiber 30 is 20 ps/nm/km at 1550 nm. The slope S of this fiber is −0.05 ps/nm$^2$/km. The dispersion of optical fiber 40 is −20 ps/nm/km at 1550 nm. The slope S of the fiber 40 is 0.05 ps/nm$^2$/km.

Figure 2:
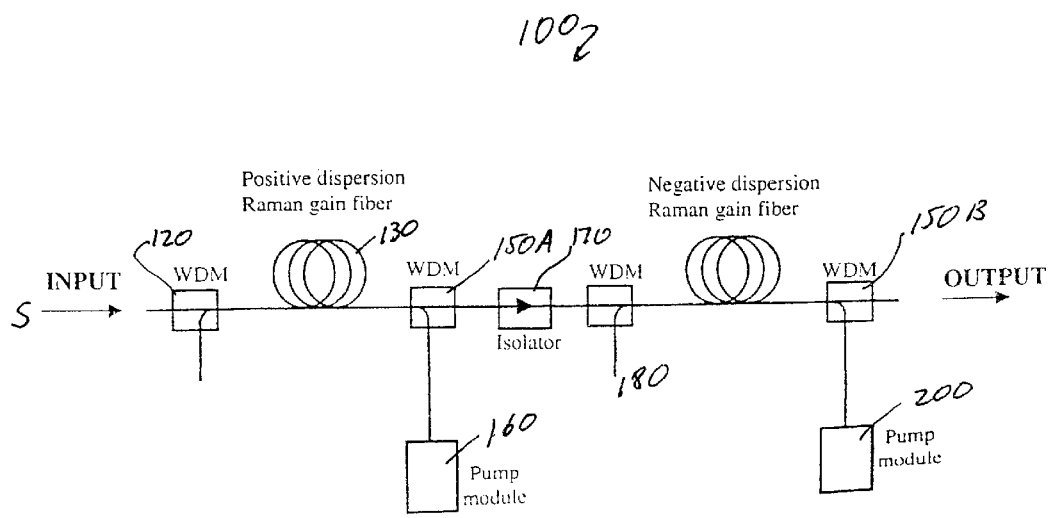
FIG. 2 is a schematic illustration of the second embodiment of a dispersion managed discrete Raman amplifier.

FIG. 2 illustrates a discrete Raman amplifier 100 that includes two amplification stages. The first amplification stage includes a length of positive dispersion, positive slope fiber 130 coupled an optical pump 160 via a WDM 150A. Another WDM, 120 is situated at at the input port of the amplifier 100. This WDM 120 is located upstream of fiber 130 and diverts unabsorbed pump light out of the Raman amplifier 100 and prevents it from propagating through the rest of the transmission system. The second amplification stage is separated from the first amplification stage by an isolator 170. This isolator 170 prevents reflected signal from propagating into the first stage of the Raman amplifier 100 and also prevents ASE noise from the second stage into the first stage. Such ASE noise depletes the pump light and reduces the signal gain. The second amplification stage includes a length of negative dispersion, negative slope fiber 180. An optical pump 200 is coupled to the fiber 180 via wavelength division multiplexer (WDM) 150B. It is noted that the fibers 130, 180 have dispersion D, wherein D>|10|ps/nm/km. It is preferable that the absolute value of dispersions be in the range of 10 to 100 ps/nm/km, and more preferably that the absolute values of dispersions be 15 to 30 ps/nm/km. More specifically, in this embodiment, the dispersion of optical fiber 130 is 20 ps/nm/km at 1550 nm. The slope S of this fiber is −0.05 ps/nm²/km. The dispersion of optical fiber 180 is −20 ps/nm/km at 1550 nm. The slope S of the fiber 180 is 0.05 ps/nm²/km. The invention can be applied to any type of Raman amplifier. The amplifier site may utilize multiple channel amplifiers and/or single channel amplifiers. The transmitted signal can be of any type and can be for any application.

The invention has been described through preferred embodiments. However, various modifications can be made without departing from the scope of the invention as defined by the appended claims and legal equivalents.

What is claimed:

1. A discrete Raman amplifier comprising: (i) an input port providing optical signal to said amplifier; (ii) an output port providing amplified optical signal out of said amplifier; (iii) at least two optical fibers, one optical fiber having positive dispersion $D_1$ of greater than 10 ps/nm/km in a 1550 nm to 1620 nm wavelength range, and length of 5 m to 2.5 km, the other fiber having a negative dispersion $D_2$ of less than −5 ps/nm/km in a 1550 nm to 1620 nm wavelength range and length of 5 m to 2.5 km, wherein the length of each of said optical fiber is chosen to provide said amplifier with a predetermined amount of dispersion.

2. The discrete Raman amplifier according to claim 1, wherein said predetermined amount of dispersion is substantially zero, such that the dispersion of the amplifier is less than 25 ps/nm over the signal wavelength range.

3. The discrete Raman amplifier according to claim 1, wherein $D_1>20$ ps/nm/km.

4. The discrete Raman amplifier according to claim 1, wherein $D_2<-10$ ps/nm/km.

5. The discrete Raman amplifier according to claim 4, wherein $D_2<-20$ ps/nm/km.

6. The amplifier of claim 1 wherein said at least two optical fibers have opposite signs of dispersion slope.

7. The amplifier of claim 1, wherein both of said optical fibers are situated in one amplifier stage.

8. The amplifier of claim 1, wherein said at least two optical fibers are situated in different amplifier stages.

9. The amplifier of claim 1, wherein the positive dispersion fiber is a photonic crystal fiber.

10. The amplifier of claim 1, wherein said optical fiber with said positive dispersion is located closer to the input port of said amplifier than the optical fiber with the negative dispersion.

11. A Raman amplifier according to claim 1, wherein said optical fiber with said negative dispersion fiber is located closer to the input port of said amplifier than the optical fiber with the positive dispersion.

12. The Raman amplifier according to claim 1, wherein said optical fiber with said positive dispersion comprises photonic crystal fiber.

13. The Raman amplifier according to claim 1 wherein optical fibers have dispersion D, wherein D>|10|ps/nm/km.

14. The Raman amplifier according to claim 10, wherein said fibers have the absolute value of dispersion in the range of 10 to 100 ps/nm/km.

15. An optical amplifier comprising: (i) an input port for providing optical signal to said amplifier; (ii) an output port for providing amplified optical signal out of said amplifier; (iii) at least two optical fibers, one with a positive dispersion $D_1$ of greater than 10 ps/nm/km in a 1550 nm to 1620 nm wavelength range, one with a negative dispersion $D_2$ of less than −5 ps/nm/km in a 1550 nm to 1620 nm wavelength range, wherein the length of each of said optical fiber is chosen to provide said amplifier with a predetermined amount of dispersion.

16. The amplifier of claim 15, wherein fiber with the positive dispersion is a photonic crystal fiber.

17. The discrete Raman amplifier according to claim 15, wherein said predetermined amount of dispersion is substantially zero, such that the dispersion of the amplifier is less than 25 ps/nm over the signal wavelength range.

18. The discrete Raman amplifier according to claim 15, wherein $D_1>20$ ps/nm/km.

19. The discrete Raman amplifier according to claim 15, wherein $D_2<-10$ ps/nm/km.

20. The discrete Raman amplifier according to claim 19, wherein $D_2<-20$ ps/nm/km.

* * * * *